Jan. 22, 1952 L. E. MAYLE 2,583,003

COUNTER CIRCUIT

Filed April 29, 1946

INVENTOR
LOUIS F. MAYLE

BY [signature]

ATTORNEY

Patented Jan. 22, 1952

2,583,003

UNITED STATES PATENT OFFICE 2,583,003

COUNTER CIRCUIT

Louis F. Mayle, Fort Wayne, Ind., assignor, by mesne assignments, to Farnsworth Research Corporation, a corporation of Indiana Application April 29, 1946, Serial No. 665,659

9 Claims. (Cl. 250—27)

This invention relates to frequency dividers, and particularly relates to a counter circuit with which large count-down ratios may be realized.

A conventional impulse counter comprises a charging condenser and a storage condenser connected in series through a diode. Accordingly, an input pulse applied to the charging condenser will charge the storage condenser through the diode. Between successive pulses the charging condenser is brought to a fixed potential, such as ground, and therefore, the voltage increments applied to the storage condenser in response to successive input pulses decrease exponentially so that the voltage across the storage condenser approaches gradually the peak voltage of the input pulses. Consequently, the voltage which can be built up across the storage condenser is limited by the voltage of the input pulses which usually is of the order of 100 volts, thus necessitating amplification of the input signal.

A serious drawback of conventional impulse counters, however, is the decrease of successive voltage increments applied across the storage condenser. Usually the storage condenser is discharged after a predetermined number of input pulses by a triggering device, such as a discharge tube which operates by amplitude selection. Thus the last voltage increment applied to the storage condenser must exceed a certain value in order to assure that the triggering device will be actuated after a predetermined number of input pulses. This requirement limits the count-down ratio available with conventional impulse counters to the order of ten to one. A counter circuit where successive voltage increments applied to the storage condenser are equal would therefore have no theoretical limit of the count-down ratio obtainable with such a circuit.

Impulse counters of the type referred to may be used for counting pulses developed in response to radio-active radiation which may consist of electrons, protons, and other positively charged particles, or in response to cosmic ultra radiation. Furthermore, counter circuits may be used for stepping down or reducing the frequency of a high frequency wave for comparing its frequency or phase with that of a low frequency wave. In a television transmission system, for example, the frequency of the line and field frequency waves must have a constant predetermined ratio. In order to keep this ratio constant the frequency of the line frequency wave may be stepped down until it equals that of the field frequency wave so that their phases may be compared directly. In all these cases counter circuits having high count-down ratios are desirable, and in some applications they are a necessity. Conventional impulse counters which have a low count-down ratio, therefore, have not been utilized to any extent for frequency comparison purposes.

It is an object of the present invention, therefore, to provide a novel impulse counter of simple design where successive voltage increments developed across a storage condenser in response to input pulses are of equal size.

Another object of the invention is to provide an electric counter circuit requiring only two tubes and having a large count-down ratio which is principally dependent upon the negative voltage developed by a triggered device, such as a blocking oscillator.

A further object of the invention is to provide a frequency divider where equal voltage increments are developed across a storage condenser upon the arrival of successive input impulses, the input pulses being utilized for triggering the circuit and requiring an amplitude of the order of 10 volts only.

In accordance with the present invention there is provided an impulse counter comprising a source of pulses to be counted, a first potential storage element coupled to the pulse source and a second potential storage element coupled to the first element. Means are provided which are controlled by the potential storage elements for varying the potential of the second element during the occurrence of the pulses by equal increments. Means are finally provided for resetting the charge on the second element after a predetermined number of pulses is stored.

For a better understanding of the invention, together with other and further objects thereof, reference is made to the following description, taken in connection with the accompanying drawing, and its scope will be pointed out in the appended claims.

Figure 1:
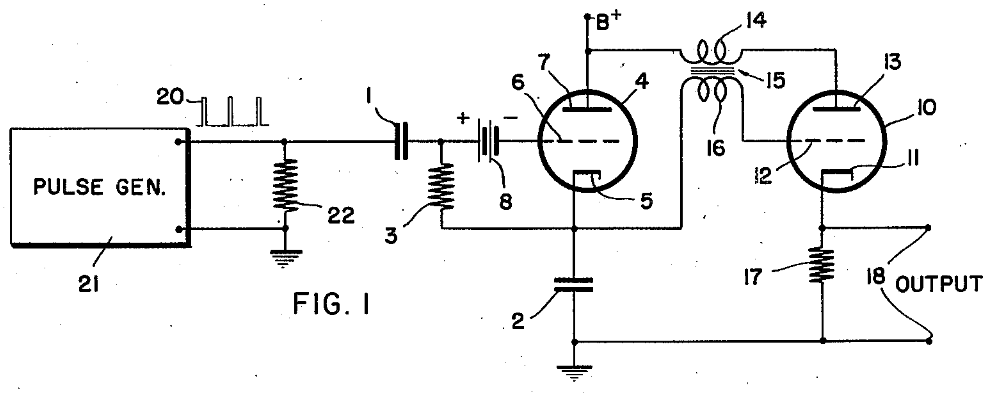
Fig. 1 is a circuit diagram of an impulse counter embodying the present invention.

Referring now to Fig. 1, there is provided charging condenser 1 and storage condenser 2 connected in series through resistor 3. Storage condenser 2 is connected between resistor 3 and ground, as illustrated. For the purpose of varying the charge on storage condenser 2 by substantially equal voltage increments, there is provided space discharge tube 4 comprising cathode 5, control grid 6 and anode 7 which may be connected to a suitable anode voltage source indicated at B+. A suitable grid bias voltage source, such as battery 8, may be provided between control grid 6 and cathode 5 so that discharge tube 4 is normally biased beyond cut-off.

For the purpose of periodically bringing storage condenser 2 to a predetermined negative potential, there is provided blocking oscillator 10 comprising cathode 11, control grid 12 and anode 13. Anode 13 is connected through winding 14 of transformer 15 to anode voltage supply B+. The other winding 16 of transformer 15 is connected between cathode 5 of discharge tube 4 and control grid 12 of blocking oscillator 10. Cathode resistor 17 is arranged between cathode 11 and ground, as illustrated. The output signal may be obtained from output terminals 18 connected across cathode resistor 17.

For the purpose of impressing input pulses indicated at 20 upon charging condenser 1, there is provided pulse generator 21. Input pulses 20, which are of positive polarity, may be developed across load resistor 22.

The counter circuit of Fig. 1 operates as follows. Let it be assumed that initially storage condenser 2 is driven by blocking oscillator 10 to a high negative potential which may be of the order of 500 volts. Since charging condenser 1 and storage condenser 2 are connected through resistor 3, the voltage on condensers 1 and 2 will equalize so that both condensers will acquire a high negative voltage. Control grid 12 of blocking oscillator 10 is held at this negative voltage by storage condenser 2, thereby biasing blocking oscillator 10 considerably beyond cut-off. In view of the bias voltage impressed by bias battery 8 between control grid 6 and cathode 5 of discharge tube 4, discharge tube 4 is also cut off.

Upon the arrival of the leading edge of the first input pulse 20 of positive polarity, the voltage of charging condenser 1 is raised toward ground, thereby driving control grid 6 positive with respect to cathode 5. Discharge tube 4 will accordingly begin to conduct space current and will discharge storage condenser 2. While tube 4 conducts space current, the voltage of storage condenser 2 is raised toward ground and with respect to the grid voltage until discharge tube 4 ceases again to conduct space current. Tube 4 is very quickly cut off again, preferably before the arrival of the trailing edge of the input pulse. Input pulses 20 only trigger discharge tube 4, while the major portion of the energy dissipated from storage condenser 2 is drained by the space current through tube 4.

Figures 2, 3, 4:
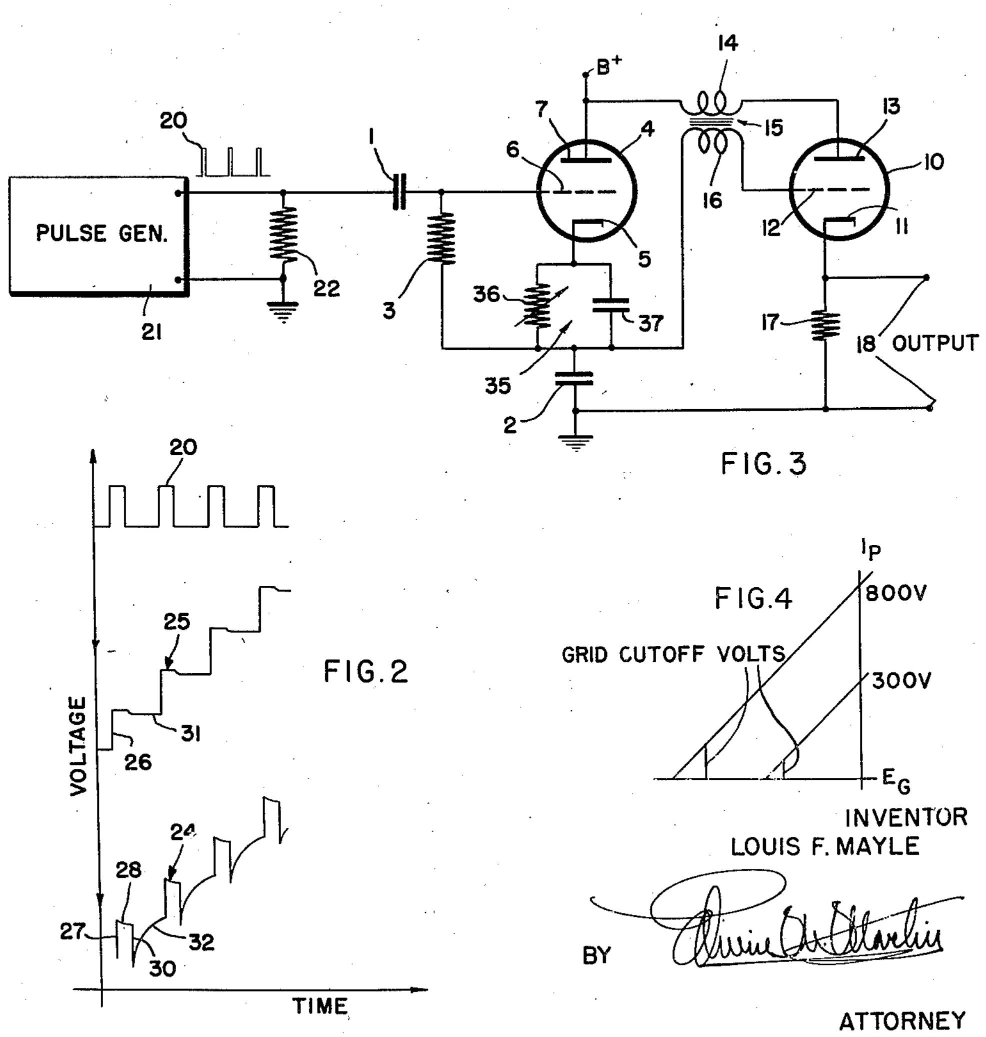
Fig. 2 is a graph representing the voltages developed at certain points of the counter circuit of Fig. 1 and plotted against time.
Fig. 3 is a circuit diagram of a preferred counter circuit in accordance with the invention.
Fig. 4 is a graph disclosing certain operating characteristics of tube 4.

Referring now to Fig. 2, there are illustrated input pulses 20 which are impressed upon charging condenser 1. The voltage across charging condenser 1, which is plotted against time, is shown at 24, while the voltage across storage condenser 2 in dependence upon time is indicated at 25. Upon the arrival of the first input impulse 20, storage condenser 2 is discharged by voltage increment 26 due to the conduction of current through discharge tube 4. At the same time the voltage of charging condenser 1 becomes more positive, as illustrated at 27, because of input pulse 20. A small portion of this positive rise of charging condenser 1 leaks off through resistor 3 into storage condenser 2 during the occurrence of the first input pulse, as shown at 28.

Upon the arrival of the trailing edge of the first input pulse 20, the voltage across charging condenser 1 goes negatively again, as illustrated at 30, to substantially its initial voltage, thus driving control grid 6 considerably beyond cut-off. The voltage at the junction point of charging condenser 1 and resistor 3 is negative with respect to the junction point between resistor 3 and storage condenser 2. Accordingly, current will flow from storage condenser 2 through resistor 3 to charging condenser 1 until the voltages of the two condensers are equal. Consequently, the voltage across storage condenser 2 will go more negative by a small amount, as indicated at 31, while simultaneously the voltage across charging condenser 1 will become more positive, as illustrated at 32. This is because condenser 2 has a much larger value than condenser 1.

In response to successive input pulses the voltage across charging condenser 1 and storage condenser 2 will become more positive by substantially equal voltage increments as illustrated by curves 24 and 25. After a predetermined number of input pulses has been impressed upon charging condenser 1, the voltage across storage condenser 2 has been raised sufficiently to fire blocking oscillator 10 in view of the fact that storage condenser 2 is coupled between control grid 12 and cathode 11 of the blocking oscillator. During a cycle of oscillation of blocking oscillator 10 a negative voltage is developed across winding 16 which is impressed upon storage condenser 2, and subsequently through resistor 3 upon charging condenser 1. The cycle of operation of the impulse counter of Fig. 1 is now complete.

Every time blocking oscillator 10 fires, an output signal is developed across its cathode resistor 17 which may be obtained from output terminals 18. This output signal may be impressed upon another counter circuit which may be identical to that illustrated in Fig. 1. The peak voltage of input pulses 20 may be between 5 and 10 volts.

It will be observed that the count-down ratio obtainable with the circuit of Fig. 1, is determined principally by the negative voltage impressed by blocking oscillator 10 at the end of each counting cycle upon storage condenser 2. The capacitance of storage condenser 2 should preferably be large compared with that of charging condenser 1. This will reduce the voltage dip indicated at 31 across storage condenser 2 between the occurrence of successive input pulses.

Actually voltage increments 26 developed by the circuit of Fig. 1 across storage condenser 2 are not perfectly equal in size, the voltage increments 26 toward the end of the counting cycle being of smaller amplitude than the voltage increments at the beginning of the counting cycle. This is due to the fact that battery 8 provides a fixed bias voltage between control grid 6 and cathode 5. Actually the grid cut-off voltage of tube 4 is dependent upon the plate-cathode voltage which varies over several hundred volts during each counting cycle. If the plate current of tube 4 is plotted against the grid voltage, a family of curves is obtained, each curve showing the plate current in dependence upon the grid voltage for a fixed plate-cathode voltage. For a large plate-cathode voltage a larger cut-off bias is required than for a small plate-cathode voltage. Accordingly, in order to obtain voltage increments 26 of equal size across storage condenser 2 the grid bias voltage should be variable in such a manner that the difference between the applied grid bias voltage and the grid cut-off voltage for any particular plate-cathode voltage may be kept constant. In other words, the applied grid bias voltage should decrease toward the end of the counting cycle when the plate-cathode voltage of tube 4 is smaller. This will be more clearly seen from Fig. 4 which shows plate current plotted against grid voltage at different values of plate-cathode voltage. It will be seen that this figure discloses the grid-cutoff voltage at different values of plate-cathode voltage. When the plate-cathode voltage is for example 800 volts the grid-cutoff voltage is higher than when the plate-cathode voltage is 300 volts. From this it is obvious that the grid-bias voltage may be variable in such a manner that the difference between applied grid-bias voltage and the grid-cutoff voltage may be kept constant for any particular plate-cathode voltage. The curves of Fig. 4 make it clearly evident that the applied grid-bias voltage decreases when the plate-cathode voltage is reduced from 800 volts to 300 volts as may happen when the tube discharges.

This is effected in the circuit of Fig. 3, in which like components are designated by the same reference numerals as were used in Fig. 1. In the counter circuit of Fig. 3, bias battery 8 is replaced by self-bias impedance 35 comprising adjustable resistor 36 and condenser 37 arranged in parallel between cathode 5 of tube 4 and storage condenser 2. By developing a self-bias voltage across cathode impedance 35, the difference between the applied bias voltage and the cut-off voltage is kept constant regardless of variations of the plate-cathode voltage of tube 4. Accordingly, it was found that voltage increments 26 developed by the circuit illustrated in Fig. 3, are of equal size throughout the counting cycle. Experiments have revealed that the slope of the envelope of curve 25 is slightly greater at the beginning of the counting cycle than at the end. However, the actual slope of the envelope of curve 25 depends upon the particular value of the circuit specifications of the impulse counter of the invention. The circuit illustrated in Fig. 3 operates in substantially the same manner as the circuit of Fig. 1. Count-down ratios of 70 to 1 have been obtained with the counter circuit of Fig. 3.

It is feasible to use a ½ type 6SL7GT tube each for discharge tube 4 and for blocking oscillator 10. It is preferred, however, to utilize a ½ type 6SL7GT tube for discharge tube 4 and a ½ type 6SN7GT tube for blocking oscillator 10 because the latter type tube will deliver more power and hence will drive storage condenser 2 to a higher negative voltage.

Experiments have revealed that the counter circuit of the invention will operate equally well on a sinusoidal input wave as it does on positive input pulses, such as illustrated at 20. The counter circuit of the invention may, for example, be used for stepping down the frequency of a sinusoidal wave which may have a frequency of several megacycles. The expression "pulses," as used in the claims, is therefore, meant to include an input wave, such as a sinusoidal wave.

While it will be understood that the circuit specifications of the impulse counter of the invention may vary according to the design for any particular application, the following circuit specifications for an impulse counter are included, by way of example only, as suitable for an input frequency of approximately 3,000 cycles per second or more.

Peak amplitude of input pulses 20, 5 to 10 volts.
Positive potential of anode voltage supply B+, +200 volts.
Voltage of grid bias battery 8, 7.5 volts.
Triode 4, ½ type 6SL7GT.
Triode 10, ½ type 6SN7GT.
Condenser 1, 200 micro-microfarads.
Condenser 2, .01 microfarad.
Resistor 3, 100,000 ohms.
Resistor 17, 18 ohms.
Transformer 15, wound on laminated audio iron core.
Winding 14, 225 turns, 70 microhenries.
Winding 16, 450 turns, 260 microhenries.
Winding sense of coils 14 and 16 is in an aiding direction when the current flows through a coil 14 from B+ to anode 13 and through coil 16 from grid 12 to condenser 2.
Condenser 37 (Fig. 3), .1 microfarad.
Adjustable resistor 36 (Fig. 3), 100,000 ohms.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An impulse counter comprising a charging condenser, a storage condenser, means for connecting said condensers in series, a space discharge tube having a control grid and a cathode, said grid being coupled to said charging condenser, said cathode being coupled to said storage condenser, means for normally biasing said tube beyond cut-off, means for impressing pulses of positive polarity on said charging condenser, thereby to render said tube conducting upon the occurrence of each pulse and to discharge said storage condenser by a predetermined amount, and means responsive to and operative at a predetermined voltage across said storage condenser for charging said storage condenser to a predetermined potential.

2. An impulse counter comprising a charging condenser, a storage condenser, an impedance for connecting said condensers in series, a space discharge tube having a control grid and a cathode, said grid being connected to said charging condenser, said cathode being coupled to said storage condenser, means for normally biasing said tube beyond cut-off, means for impressing pulses of positive polarity on said charging condenser, thereby to render said tube conducting upon the occurrence of each pulse and to discharge said storage condenser by a predetermined amount, and means responsive to and operative at a predetermined voltage across said storage condenser for charging said storage condenser to a predetermined negative potential.

3. An impulse counter comprising a charging condenser, a storage condenser, the capacitance of said storage condenser being larger than that of said charging condenser, a resistor for connecting said condensers in series, a space discharge tube having a control grid and a cathode, said grid being connected to said charging condenser, said cathode being coupled to said storage condenser, means for normally biasing said tube beyond cut-off, means for impressing pulses of positive polarity on said charging condenser, thereby to render said tube conducting upon the occurrence of each pulse and to discharge said storage condenser by a predetermined amount, and means responsive to and operative at a predetermined voltage across said storage condenser for charging said storage condenser to a predetermined negative potential.

4. An impulse counter comprising a charging condenser, a storage condenser, impedance means for connecting said condensers in series, a space discharge tube having a control grid and a cathode, said grid being coupled to said charging condenser, said cathode being coupled to said storage condenser, means for normally biasing said tube beyond cut-off, means for impressing pulses of positive polarity upon said charging condenser, thereby to render said tube conducting upon the occurrence of each pulse and to discharge said storage condenser by a predetermined amount, and a blocking oscillator having a control grid, said storage condenser being coupled to the grid of said blocking oscillator, said blocking oscillator being normally cut off and being rendered conductive when the voltage across said storage condenser reaches a predetermined value, thereby to impress a negative potential upon said storage condenser.

5. An impulse counter comprising a charging condenser, a storage condenser, impedance means for connecting said condensers in series, a space discharge tube having a control grid and a cathode, said grid being coupled to said charging condenser, said cathode being coupled to said storage condenser, means for normally biasing said tube beyond cut-off, means for impressing pulses of positive polarity upon said charging condenser, thereby to render said tube conducting upon the occurrence of each pulse and to discharge said storage condenser by a predetermined amount, a blocking oscillator having a control grid and a cathode, said storage condenser being coupled between the grid and the cathode of said blocking oscillator, said blocking oscillator being normally cut off and being rendered conductive when the voltage across said storage condenser reaches a predetermined value, thereby to impress a negative potential upon said storage condenser, and means for developing an output signal when said blocking oscillator is rendered conductive.

6. An impulse counter comprising a charging condenser, a storage condenser, a resistor for connecting said condensers in series, a space discharge tube having a control grid and a cathode, said grid being coupled to said charging condenser, said cathode being coupled to said storage condenser, means for normally biasing said tube beyond cut-off, means for impressing pulses of positive polarity upon said charging condenser, thereby to render said tube conducting upon the occurrence of each pulse and to discharge said storage condenser by a predetermined amount, a blocking oscillator having a control grid and a cathode, said storage condenser being coupled between the grid and the cathode of said blocking oscillator, said blocking oscillator being normally cut off and being rendered conductive when the voltage across said storage condenser reaches a predetermined value, thereby to impress a negative potential upon said storage condenser, and a cathode resistor in the cathode circuit of said blocking oscillator for deriving an output signal thereacross.

7. An impulse counter comprising a charging condenser, a storage condenser, an impedance for connecting said condensers in series, a space discharge tube having a control grid and a cathode, said grid being connected to said charging condenser, said cathode being connected to said storage condenser, a bias voltage source connected between said grid and said cathode, means for impressing pulses of positive polarity upon said charging condenser, thereby to render said tube conducting upon the occurrence of each pulse and to discharge said charging condenser by a predetermined amount, and means responsive to and operative at a predetermined voltage across said storage condenser for charging said storage condenser to a predetermined negative potential.

8. An impulse counter comprising a charging condenser, a storage condenser, an impedance for connecting said condensers in series, a space discharge tube having a control grid and a cathode, said grid being connected to said charging condenser, a further impedance for connecting said cathode to said storage condenser, means for impressing pulses of positive polarity upon said charging condenser, thereby to render said tube conducting upon the occurrence of each pulse and to discharge said charging condenser by a predetermined amount, and means responsive to and operative at a predetermined voltage across said storage condenser for charging said storage condenser to a predetermined negative potential.

9. An impulse counter comprising a charging condenser, a storage condenser, an impedance for connecting said condensers in series, a space discharge tube having a control grid and a cathode, said grid being connected to said charging condenser, a resistor and a further condenser connected in parallel between said cathode and said storage condenser, means for impressing pulses of positive polarity upon said charging condenser, thereby to render said tube conducting upon the occurrence of each pulse and to discharge said charging condenser by a predetermined amount, and means responsive to and operative at a predetermined voltage across said storage condenser for charging said storage condenser to a predetermined negative potential.

LOUIS F. MAYLE.

REFERENCES CITED

The following references are of record in the file of this patent:

UNITED STATES PATENTS

| Number | Name | Date |
|---|---|---|
| 1,896,417 | Page | Feb. 7, 1933 |
| 2,113,011 | White | Apr. 5, 1938 |
| 2,275,460 | Page | Mar. 10, 1942 |
| 2,474,040 | Day | June 21, 1949 |